United States Patent
Nagamitsu (10) Patent No.: US 11,599,351 B2
(45) Date of Patent: Mar. 7, 2023

(54) SERVER, UPDATE MANAGEMENT METHOD, NON-TRANSITORY STORAGE MEDIUM, AND CENTER

(71) Applicant: TOYOTA JIDOSHA KABUSHIKI KAISHA, Toyota (JP)

(72) Inventor: Shoichi Nagamitsu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/354,748

(22) Filed: Jun. 22, 2021

(65) Prior Publication Data

US 2022/0012038 A1 Jan. 13, 2022

(30) Foreign Application Priority Data

Jul. 8, 2020 (JP) .............................. JP2020-117924

(51) Int. Cl.
*G06F 8/65* (2018.01)

(52) U.S. Cl.
CPC ...................... *G06F 8/65* (2013.01)

(58) Field of Classification Search
USPC ......................................................... 717/171
See application file for complete search history.

(56) References Cited

U.S. PATENT DOCUMENTS

| | | | | |
|---|---|---|---|---|
| 2014/0109075 A1* | 4/2014 | Hoffman | ............ | G06F 11/1464 717/169 |
| 2018/0024826 A1* | 1/2018 | Caushi | ...................... | G06F 8/65 717/172 |
| 2018/0081670 A1* | 3/2018 | Caushi | ...................... | G07C 5/00 |
| 2018/0097804 A1* | 4/2018 | Boehm | ................ | G06Q 20/145 |
| 2020/0218531 A1* | 7/2020 | Kushwaha | ................ | G06F 8/66 |

FOREIGN PATENT DOCUMENTS

JP 2004-326689 A 11/2004

OTHER PUBLICATIONS

B. Kim et al.; "ECU Software Updating Scenario Using OTA Technology through Mobile Communication Network"; 2018 IEEE 3rd International Conference on Communication and Information Systems (ICCIS) pp. 67-72; 2018 (Year: 2018).*

* cited by examiner

*Primary Examiner* — Qing Chen
*Assistant Examiner* — Clint Thatcher
(74) *Attorney, Agent, or Firm* — Oliff PLC (57) ABSTRACT

A server includes: a storage unit that stores, for each of pieces of vehicle identification information that identifies a vehicle, life cycle status information indicating a distribution status of the vehicle after manufacturing, the life cycle status information being associated with the vehicle identification information; a communication unit that receives a confirmation request including the vehicle identification information from the vehicle; and a control unit that determines whether there is update data of software of the vehicle identified by the vehicle identification information included in the confirmation request when the communication unit receives the confirmation request. The control unit transmits, to the vehicle, instruction information instructing whether approval is required at a time of execution of a software update process in the vehicle, based on the life cycle status information, when determining that there is the update data of the software of the vehicle.

7 Claims, 6 Drawing Sheets

| VEHICLE ID | LIFE CYCLE STATUS | ECU1 | ECU2 | ECU3 | ECU4 | ... |
|---|---|---|---|---|---|---|
| VID_1001 | 1 | 1.2 | 2.1 | 1.4 | 1.0 | |
| VID_1002 | 3 | 1.2 | 2.1 | 1.4 | 1.0 | |
| VID_1003 | 5 | 2.0 | 3.0 | 1.4 | 1.0 | |
| VID_2004 | 2 | 1.5 | 2.1 | — | 1.0 | |
| VID_2005 | 1 | 1.5 | 2.1 | — | — | |
| | | | | | | |

| VEHICLE ID | LIFE CYCLE STATUS | ECU 1 | ECU 2 | ECU 3 | ECU 4 | ... |
|---|---|---|---|---|---|---|
| VID_1001 | 1 | 1.2 | 2.1 | 1.4 | 1.0 | |
| VID_1002 | 3 | 1.2 | 2.1 | 1.4 | 1.0 | |
| VID_1003 | 5 | 2.0 | 3.0 | 1.4 | 1.0 | |
| VID_2004 | 2 | 1.5 | 2.1 | – | 1.0 | |
| VID_2005 | 1 | 1.5 | 2.1 | – | – | |
| | | | | | | |

FIG. 6

| No. | LIFE CYCLE STATUS |
|---|---|
| 1 | YARD |
| 2 | TRANSPORT SHIP |
| 3 | BEING TRANSPORTED TO DEALERSHIP |
| 4 | DEALERSHIP |
| 5 | CONTRACTED FOR SALE (OTA CONTRACT NOT COMPLETED) |
| 6 | CONTRACTED FOR SALE (OTA CONTRACT COMPLETED) |
| 7 | DISTRIBUTED AS USED CAR |
| 8 | BEING TRANSPORTED TO OTHER COUNTRY |
| 9 | SCRAPPED |

SERVER, UPDATE MANAGEMENT METHOD, NON-TRANSITORY STORAGE MEDIUM, AND CENTER

CROSS-REFERENCE TO RELATED APPLICATION

This application claims priority to Japanese Patent Application No. 2020-117924 filed on Jul. 8, 2020, incorporated herein by reference in its entirety.

BACKGROUND

1. Technical Field

The present disclosure relates to a server, an update management method, a non-transitory storage medium, and a center for managing a software update of an electronic control unit.

2. Description of Related Art

A vehicle is equipped with a plurality of electronic control units (ECUs) for controlling operation of the vehicle. The ECU includes a processor, a temporary storage unit such as a random access memory (RAM), and a non-volatile storage unit such as a flash read-only memory (ROM). The processor executes software stored in the non-volatile storage unit to realize the control function of the ECU. The software stored in each ECU is rewritable, and by updating the software to a newer version, it is possible to improve the function of each ECU or add a new vehicle control function.

As a technology for updating the software of the ECU, an over-the-air (OTA) technology is known (for example, refer to Japanese Unexamined Patent Application Publication No. 2004-326689 (JP 2004-326689 A)), in which the electronic control unit connected to the in-vehicle network is wirelessly connected to a communication network such as the Internet, the software is downloaded from the server via wireless communication, and the downloaded software is installed, thereby updating or adding software of the ECU.

SUMMARY

When updating software by OTA, it is necessary to notify the user or the administrator of the content of the vehicle function to be updated and restrictions associated therewith, and obtain approval of the user or the administrator. The entity that gives the approval may change depending on the distribution situation of the vehicle. For example, the entity that gives the approval when the vehicle is in the yard is the manufacturer, the entity that gives the approval when the vehicle is being transported to the dealership is the dealership, and the entity that gives the approval after the OTA contract or sales contract is the owner. For example, when the vehicle is in a yard or a transport ship and there is a software update campaign, it is preferable to update the software with a predetermined operation on the vehicle to update the software of the electronic control unit to its latest version.

However, if it is difficult for the OTA server to know where the vehicle is and who the entity that gives approval to the software update by OTA is, it is conceivable that the software update is not performed in a timely manner during the life cycle of the vehicle.

Thus, the present disclosure provides a server, an update management method, a non-transitory storage medium, and a center capable of performing software updates in a timely manner throughout the life cycle of the vehicle.

A first aspect of the present disclosure relates to a server including a processor configured to: store, for each of pieces of vehicle identification information that identifies a vehicle, life cycle status information indicating a distribution status of the vehicle after manufacturing, the life cycle status information being associated with the vehicle identification information; receive a confirmation request including the vehicle identification information from the vehicle; determine whether there is update data of software of the vehicle identified by the vehicle identification information included in the confirmation request when the processor receives the confirmation request; and transmit, to the vehicle, instruction information instructing whether approval is required at a time of execution of a software update process in the vehicle, based on the life cycle status information associated with the vehicle identification information included in the confirmation request, when the processor determines that there is the update data of the software of the vehicle.

A second aspect of the present disclosure relates to an update management method that is executed by a computer including a processor, a memory, and a storage device. The update management method includes: storing, for each of pieces of vehicle identification information that identifies a vehicle, life cycle status information indicating a distribution status of the vehicle after manufacturing, the life cycle status information being associated with the vehicle identification information; receiving a confirmation request including the vehicle identification information from the vehicle; determining whether there is update data of software of the vehicle identified by the vehicle identification information included in the confirmation request when receiving the confirmation request; and transmitting, to the vehicle, instruction information instructing whether approval is required at a time of execution of a software update process in the vehicle, based on the life cycle status information associated with the vehicle identification information included in the confirmation request, when determining that there is the update data of the software of the vehicle.

A third aspect of the present disclosure relates to a non-transitory storage medium storing instructions that are executable by one or more processors and that cause the one or more processors to perform functions. The functions include: storing, for each of pieces of vehicle identification information that identifies a vehicle, life cycle status information indicating a distribution status of the vehicle after manufacturing, the life cycle status information being associated with the vehicle identification information; receiving a confirmation request including the vehicle identification information from the vehicle; determining whether there is update data of software of the vehicle identified by the vehicle identification information included in the confirmation request when receiving the confirmation request; and transmitting, to the vehicle, instruction information instructing whether approval is required at a time of execution of a software update process in the vehicle, based on the life cycle status information associated with the vehicle identification information included in the confirmation request, when determining that there is the update data of the software of the vehicle.

A fourth aspect of the present disclosure relates to a center that includes a processor. The processor is configured to: store, for each of pieces of vehicle identification information that identifies a vehicle, life cycle status information indicating a distribution status of the vehicle after manufacturing, the life cycle status information being associated with the vehicle identification information; receive a confirmation request including the vehicle identification information from the vehicle; determine whether there is update data of software of the vehicle identified by the vehicle identification information included in the confirmation request when the processor receives the confirmation request; and transmit, to the vehicle, instruction information instructing whether approval is required at a time of execution of a software update process in the vehicle, based on the life cycle status information associated with the vehicle identification information included in the confirmation request, when the processor determines that there is the update data of the software of the vehicle.

According to the present disclosure, it is possible to provide a server, an update management method, a non-transitory storage medium, and a center capable of performing software updates in a timely manner throughout the life cycle of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
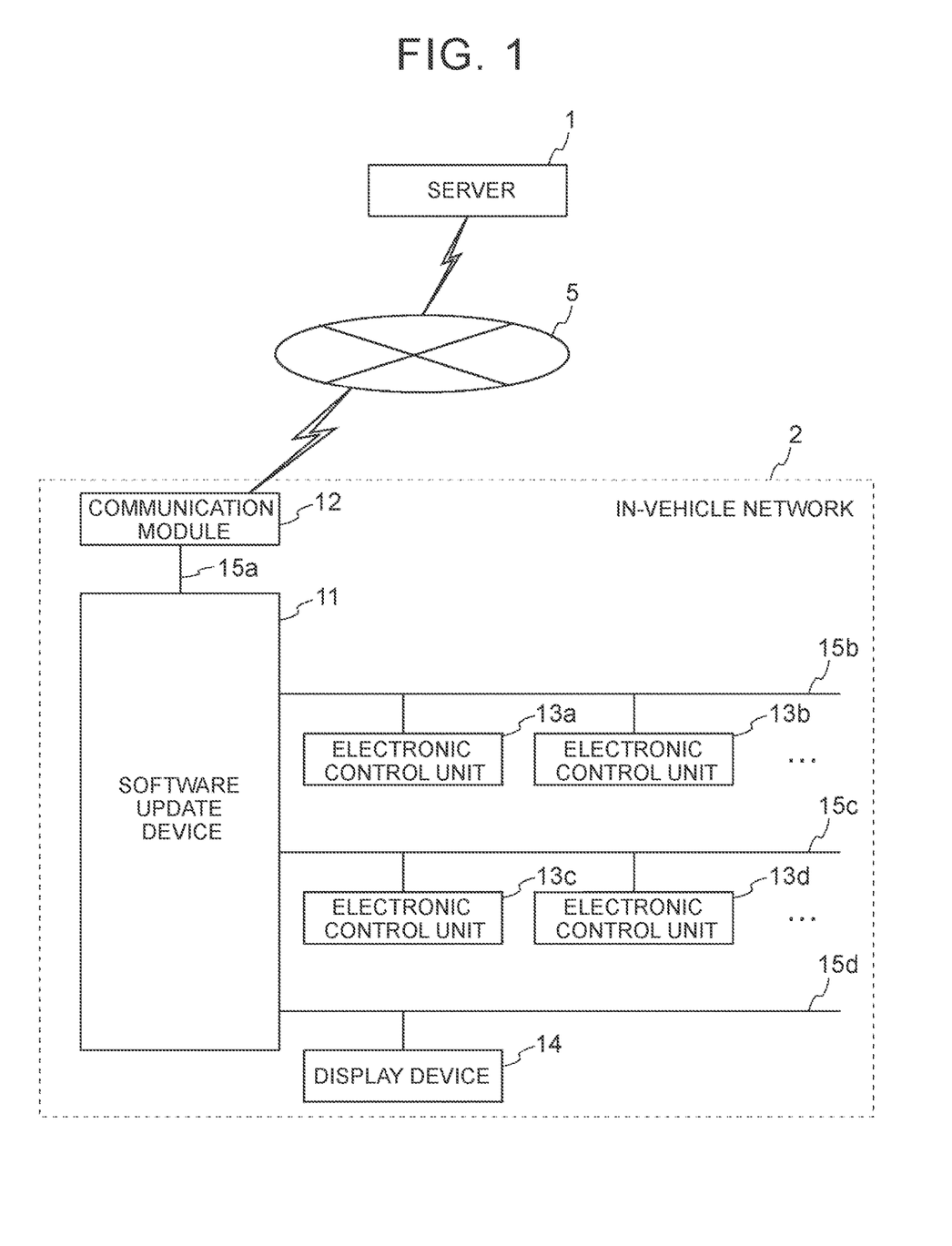
FIG. 1 is a block diagram showing an overall configuration of a network system according to an embodiment.
Figure 2:
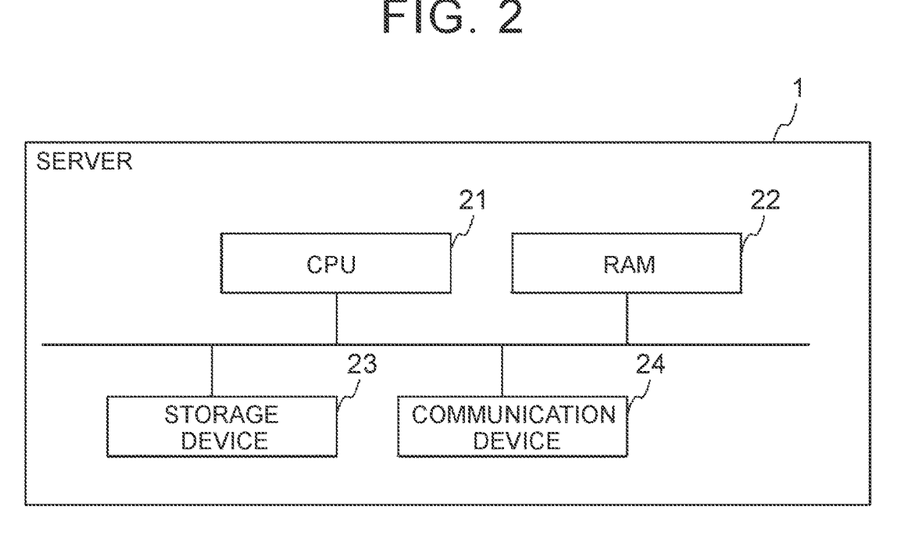
FIG. 2 is a block diagram showing a schematic configuration of a server shown in FIG. 1.
Figure 3:
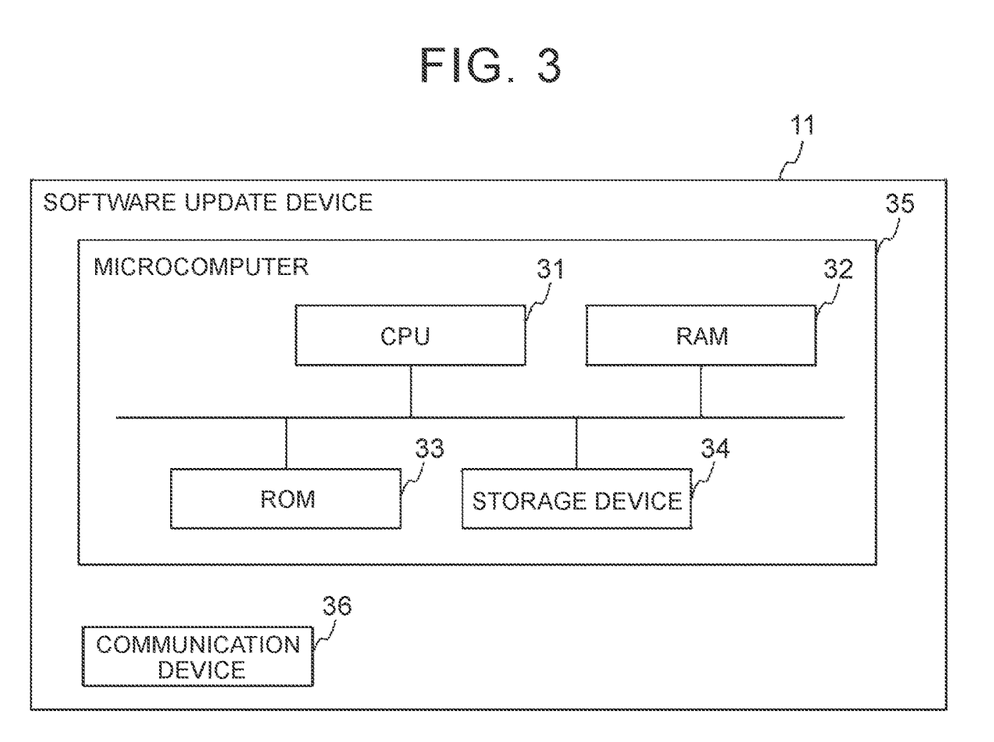
FIG. 3 is a block diagram showing a schematic configuration of a software update device shown in FIG. 1.

FIG. 1 is a block diagram showing an overall configuration of a network system according to an embodiment, FIG. 2 is a block diagram showing a schematic configuration of a server shown in FIG. 1, and FIG. 3 is a block diagram showing a schematic configuration of a software update device shown in FIG. 1.

The network system shown in FIG. 1 is a system for updating programs of electronic control units 13a to 13d mounted on a vehicle, and includes a server 1 (center) and an in-vehicle network 2 mounted on the vehicle.

The server 1 can communicate with a software update device 11 mounted on the vehicle via a network 5, and manages software updates of the electronic control units 13a to 13d mounted on the vehicle.

As shown in FIG. 2, the server 1 includes a central processing unit (CPU) 21, a random access memory (RAM) 22, a storage device 23, and a communication device 24. The storage device 23 includes a readable and writable storage medium such as a hard disk or a solid state drive (SSD), and stores a program for executing software update management, update management information described later, and update data of the electronic control unit. In the server 1, the CPU 21 executes a control process described later by executing the program read from the storage device 23 using the RAM 22 as a work area. The communication device 24 is a device that communicates with the software update device 11 via a network.

The in-vehicle network 2 includes the software update device 11 (over-the-air (OTA) master), a communication module 12, the electronic control units 13a to 13d, and a display device 14. The software update device 11 is connected to the communication module 12 via a bus 15a, is connected to the electronic control units 13a and 13b via a bus 15b, is connected to the electronic control units 13c and 13d via a bus 15c, and is connected to the display device 14 via a bus 15d. The software update device 11 can communicate with the server 1 wirelessly (by over-the-air) via the communication module 12. The software update device 11 controls the software update of the electronic control unit to be updated, among the electronic control units 13a to 13d, based on the update data acquired from the server 1. The software update device 11 may also be referred to as a central gateway. The communication module 12 is a communication device that connects the in-vehicle network 2 and the server 1. The electronic control units 13a to 13d are electronic control units (ECUs) that control operation of various parts of the vehicle, and each include a CPU, a RAM, and a non-volatile storage device such as a flash memory or an electrically erasable and programmable read-only memory (EEPROM). The CPU uses the RAM as a work area to execute the program stored in the storage device, thereby executing the control function. The display device 14 (human machine interface (HMI)) is used to display various indications such as an indication of the fact that there is update data, an indication of a request for approval for software update from the user, an indication of update results, and the like, at the time of update process of the software of the electronic control units 13a to 13d. As the display device 14, a display device of a car navigation system can be typically used, but the display device 14 is not particularly limited as long as it can display information necessary for the software update process. Although four electronic control units 13a to 13d are illustrated in FIG. 1, the number of electronic control units is not particularly limited. In addition, another electronic control unit may be further connected to the bus 15d shown in FIG. 1, besides the display device 14.

As shown in FIG. 3, the software update device 11 includes: a microcomputer 35 having a CPU 31, a RAM 32, a ROM 33, and a storage device 34; and a communication device 36. In the software update device 11, the CPU 31 of the microcomputer 35 executes a control process described later by executing the program read from the ROM 33 using the RAM 32 as a work area. The communication device 36 is a device that communicates with the communication module 12, the electronic control units 13a to 13d, and the display device 14 via the buses 15a to 15d shown in FIG. 1.

Figure 4:
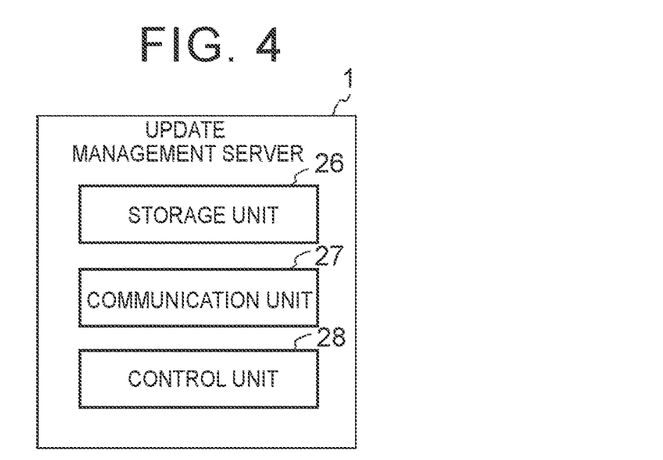
FIG. 4 is a functional block diagram of the server shown in FIG. 1.
Figure 5:
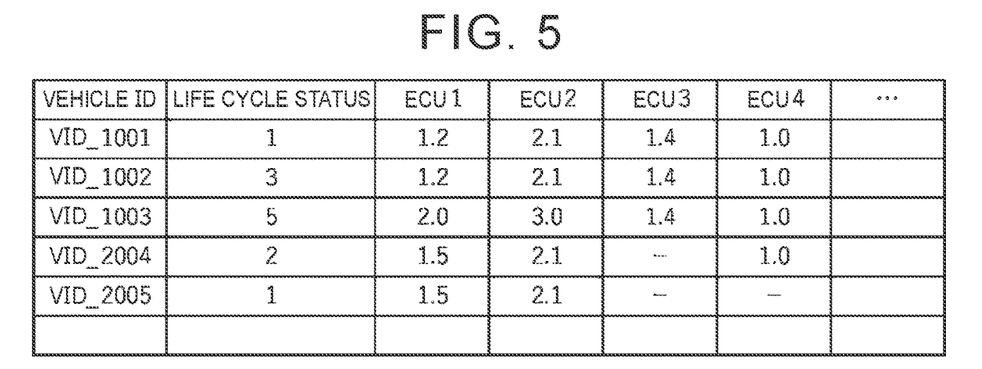
FIG. 5 is a diagram showing an example of update management information stored in the server shown in FIG. 1.
Figure 6:
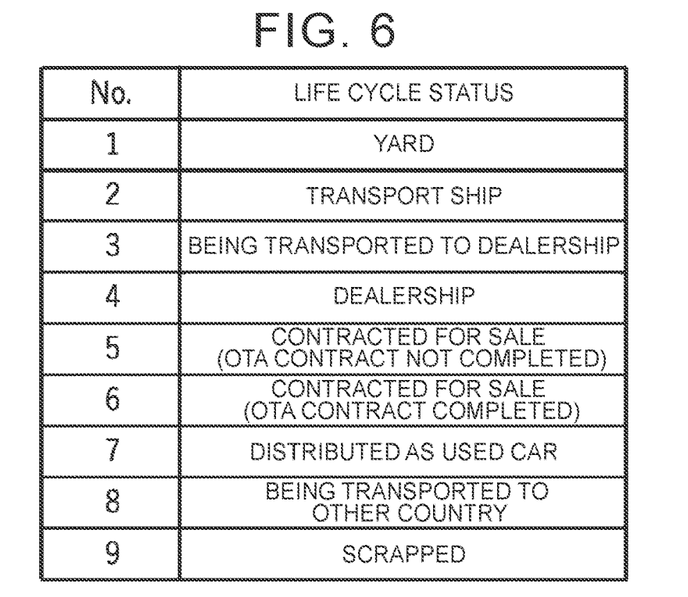
FIG. 6 is a diagram illustrating life cycle statuses shown in FIG. 5.

FIG. 4 is a functional block diagram of the server shown in FIG. 1, FIG. 5 is a diagram showing an example of update management information stored in the server shown in FIG. 1, and FIG. 6 is a diagram illustrating life cycle statuses shown in FIG. 5.

The server 1 includes a storage unit 26, a communication unit 27, and a control unit 28. The communication unit 27 and the control unit 28 are realized by the CPU 21 shown in FIG. 2 executing a program stored in the storage device 23 using the RAM 22, and the storage unit 26 is realized by the storage device 23 shown in FIG. 2.

The storage unit 26 stores the update management information. As shown in FIG. 5, the update management information is information in which vehicle identification information (vehicle ID) for identifying the vehicle, life cycle status information indicating a distribution status of the vehicle specified by the vehicle ID after manufacturing, and information indicating available software for the electronic control unit are associated with each other. In the present embodiment, a combination of the latest version information of the software of each of the electronic control units is defined as the information indicating the available software for the electronic control unit.

The life cycle status information is information for specifying the state of the vehicle during the life cycle. For example, as shown in FIG. 6, the following states can be set for the life cycle status information: being in the yard before shipment; being transported by a transport ship; being transported to a dealership; being in a dealership; being already contracted for sale (i.e., the ownership has been transferred to the user); being distributed as a used car; being transported from the original destination country to another country; being already scrapped; and so on. The life cycle statuses shown in FIG. 6 are examples, and vehicle states other than those shown in FIG. 6 can be defined. For example, information indicating at least one of the following can be set as the life cycle status information: that the vehicle is under development; that the vehicle is being manufactured; that the vehicle is being transported; that the vehicle is being sold; that the vehicle is owned by the user; that the vehicle is being repaired; the registration status of the user of the vehicle (before or after user registration); the ownership status of the vehicle (the vehicle is owned by the user or not owned by the user); and the type of the user of the vehicle (individual, corporation, sharing, etc.). The life cycle status information of the update management information shown in FIG. 5 can be appropriately acquired from information sources such as a manufacturing management database, a sales management database, a user information database, and a registration information database, and set.

In the example of FIG. 6, the update management information is provided as one table in which the life cycle status information and the version information of the available software are associated with each vehicle ID. However, a table in which the life cycle status information is associated with each vehicle ID and a table in which the version information of the available software is associated with each vehicle ID may be provided. When the life cycle status information and the version information of the available software are set as separate tables, the life cycle status information needs to be set for each vehicle ID, but the version information of the available software need not to necessarily be set for each vehicle ID. For example, the version information of the available software may be set for each vehicle type ID that identifies the vehicle type (model).

In addition, the storage unit 26 further stores the update data of the electronic control unit. However, instead of storing the update data in the storage unit 26, a distribution server for the update data may be provided separately from the server 1.

The communication unit 27 can receive a software update confirmation request from the software update device 11. The update confirmation request is, for example, information transmitted from the software update device 11 to the server 1 when power supply or ignition is turned on in the vehicle, and is information for requesting the server 1 to confirm whether there is update data of the electronic control unit. Further, the communication unit 27 receives a transmission request (download request) of a distribution package from the software update device 11. Upon receiving the download request of the distribution package, the communication unit 27 transmits, to the software update device 11, instruction information instructing whether approval is required at the time of execution of the software update process.

When the communication unit 27 receives the update confirmation request, the control unit 28 determines whether there is update data of the software of the vehicle specified by the vehicle ID included in the update confirmation request, based on the update management information stored in the storage unit 26.

The above instruction information is generated based on the life cycle status information included in the update management information stored in the storage unit 26. As an example, the instruction information can be generated by the control unit 28 based on the life cycle status information of the vehicle ID included in the download request when the download request for the distribution package is received from the software update device 11. As another example, the instruction information may be generated by the control unit 28 based on the updated life cycle status information when the life cycle status information included in the update management information is updated.

Basically, the approval of the user (or administrator) is required when the software update process of the electronic control unit is executed. However, for example, when the vehicle is in the yard before transportation or is being transported by a transport ship, the approval of the user is not required because the vehicle has not yet been sold and is owned by the manufacturer. In this case, the software of the electronic control unit may be updated to the latest state without asking for approval. Therefore, when the life cycle status information set in the update management information is "1" or "2" in FIG. 6, the control unit 28 generates instruction information indicating that approval at the time of update process is not required. When the life cycle status information set in the update management information is "3" to "7" in FIG. 6, the control unit 28 generates instruction information indicating that approval at the time of update process is required.

It should be noted that the necessity of approval, which is instructed for the software update device 11 with the instruction information, can be appropriately changed by taking separately set pre-registration information into account, in addition to the life cycle status information. For example, when the vehicle is being transported to the dealership or the vehicle is in the dealership (in the case of "3" or "4" in FIG. 6) and it is registered in advance that the software update process is executed without approval, the control unit 28 may generate instruction information indicating that approval at the time of update process is not required.

Figure 7:
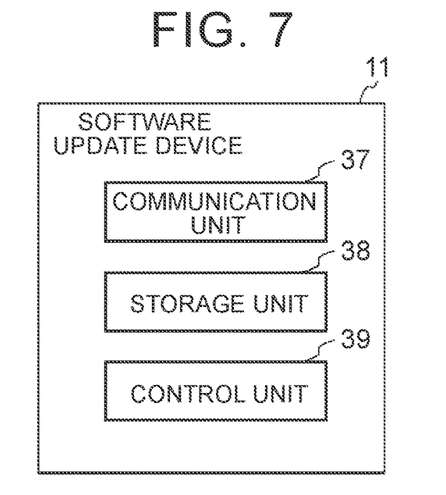
FIG. 7 is a functional block diagram of the software update device shown in FIG. 1.

FIG. 7 is a functional block diagram of the software update device shown in FIG. 1.

The software update device 11 includes a communication unit 37, a storage unit 38, and a control unit 39. The communication unit 37 and the control unit 39 are realized by the CPU 31 shown in FIG. 3 executing a program stored in the ROM 33 using the RAM 32. The storage unit 38 is realized by the storage device 34 shown in FIG. 3.

For example, when power supply or ignition of the vehicle is turned on, the communication unit 37 transmits the update confirmation request for the software of the electronic control unit to the server 1, and receives the confirmation result (whether there is update data) from the server 1. The update confirmation request includes, for example, the vehicle ID for identifying the vehicle and program versions of the electronic control units 13a to 13d connected to the in-vehicle network 2. When there is update data of the software of the electronic control unit, the communication unit 37 transmits a download request for the distribution package to the server 1 and receives the distribution package transmitted from the server 1. The distribution package includes the update data of the software of the electronic control unit and instruction information indicating whether the approval is required when the software update process is executed. In addition to the update data and the instruction information, the distribution package may include verification data for verifying the authenticity of the update data, the number and installation order of update data, various control information used at the time of software update, and the like.

The control unit 39 verifies the authenticity of the distribution package received from the server 1 by the communication unit 37 and stored in the storage unit 38. Next, the control unit 39 transfers the downloaded one or more update data to the electronic control unit to be updated, and causes the electronic control unit to be updated to install the update data. When the installation is completed, the control unit 39 instructs the electronic control unit to be updated to activate the installed update data. When there is only one software storage area provided in the storage device of the electronic control unit, installation and activation are performed in succession. When the control unit 39 performs installation and activation control processes, the software update of the electronic control unit to be updated is completed.

Here, the software update process involves a phase of downloading the update data from the server 1, a phase of transferring the downloaded update data to the electronic control unit to be updated and installing the update data in the storage area of the electronic control unit to be updated, and a phase of activation in which the updated version of the software installed in the electronic control unit to be updated is activated.

Downloading is a process of receiving and storing the update data transmitted from the server 1 for updating the software of the electronic control unit. The downloading phase includes, besides receiving the update data, control of a series of processes related to downloading, such as determination as to whether downloading can be performed and verification of the update data. Installation is a process of writing an update version of the program (update software) in the storage area of the electronic control unit to be updated based on the downloaded update data. The installation phase includes, in addition to execution of installation, control of a series of processes related to installation, such as determination as to whether installation can be performed, transfer of the update data, and verification of the updated version of the program. Activation is a process of activating the installed updated version of the program. The activation control includes, in addition to execution of activation, control of a series of processes related to activation, such as determination as to whether the activation can be performed and verification of the execution results.

The update data transmitted from the server 1 to the software update device 11 may include any of the update software of the electronic control unit, the compressed data obtained by compressing the update software, and the divided data obtained by dividing the update software or the compressed data. Further, the update data may include an identifier for identifying the electronic control unit to be updated (ECU ID) and an identifier for identifying the software before update (ECU software ID). The update data is downloaded as the distribution package described above, and the distribution package contains the update data of one or more electronic control units.

When the update data includes the update software itself, the software update device transfers the update data (update software) to the electronic control unit to be updated during the installation phase. When the update data includes compressed data, difference data, or divided data of the update software, the software update device 11 may transfer the update data to the electronic control unit to be updated and the electronic control unit to be updated may generate the update software from the update data. Alternatively, the software update device 11 may transfer the update software to the electronic control unit to be updated after generating the update software from the update data. Here, the update software can be generated by decompressing the compressed data and assembling the difference data or the divided data.

The update software can be installed by the electronic control unit to be updated based on the installation request from the software update device 11. Alternatively, the electronic control unit to be updated that has received the update data may autonomously perform installation without receiving an explicit instruction from the software update device 11.

The update software can be activated by the electronic control unit to be updated based on the activation request from the software update device 11. Alternatively, the electronic control unit to be updated that has received the update data may autonomously perform activation without receiving an explicit instruction from the software update device 11.

The software update process can be performed continuously or in parallel for each of the electronic control units.

Further, the "software update process" in the present specification includes not only a process of continuously performing all of the downloading, installation, and activation, but also a process of performing only a part of the downloading, installation, and activation.

Hereinafter, the control process executed by the server 1 and the software update device 11 will be described.

Figure 8:
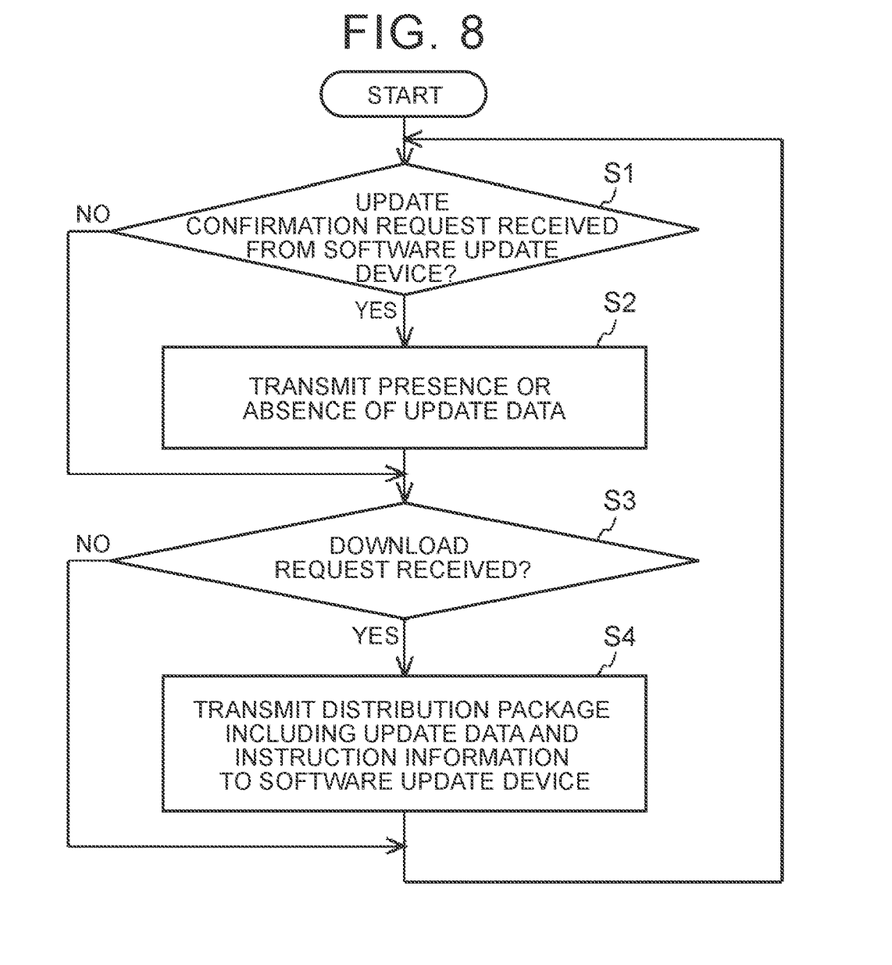
FIG. 8 is a flowchart showing an example of a control process executed by the server according to the embodiment.

FIG. 8 is a flowchart showing an example of the control process executed by the server according to the embodiment. The control process shown in FIG. 8 is repeatedly executed, for example, at predetermined time intervals.

In step S1, the communication unit 27 determines whether the update confirmation request has been received from the software update device 11. When the determination in step S1 is YES, the process proceeds to step S2; otherwise, the process proceeds to step S3.

In step S2, the communication unit 27 transmits information indicating whether there is update data of the software of the electronic control unit to the vehicle that has transmitted the update confirmation request. It can be determined that there is update data, for example, when the control unit 28 compares the combination of software versions (see FIG.

5) associated with the vehicle ID included in the update confirmation request and stored in the update management information, with the combination of the current software versions included in the update confirmation request, and the combination of the current software versions included in the update confirmation request is older than the combination of the versions stored in the update management information. Then, the process proceeds to step S3.

In step S3, the communication unit 27 determines whether the download request for the distribution package has been received from the software update device 11. When the determination in step S3 is YES, the process proceeds to step S4; otherwise, the process proceeds to step S1.

In step S3, the communication unit 27 transmits the distribution package including software update data and instruction information to the software update device 11. When it is registered in advance that the approval at the time of software update is not required for the vehicle specified by the vehicle ID included in the download request, the necessity of the approval in the instruction information may be changed based on the pre-registered information. Then, the process proceeds to step S1.

Figure 9:
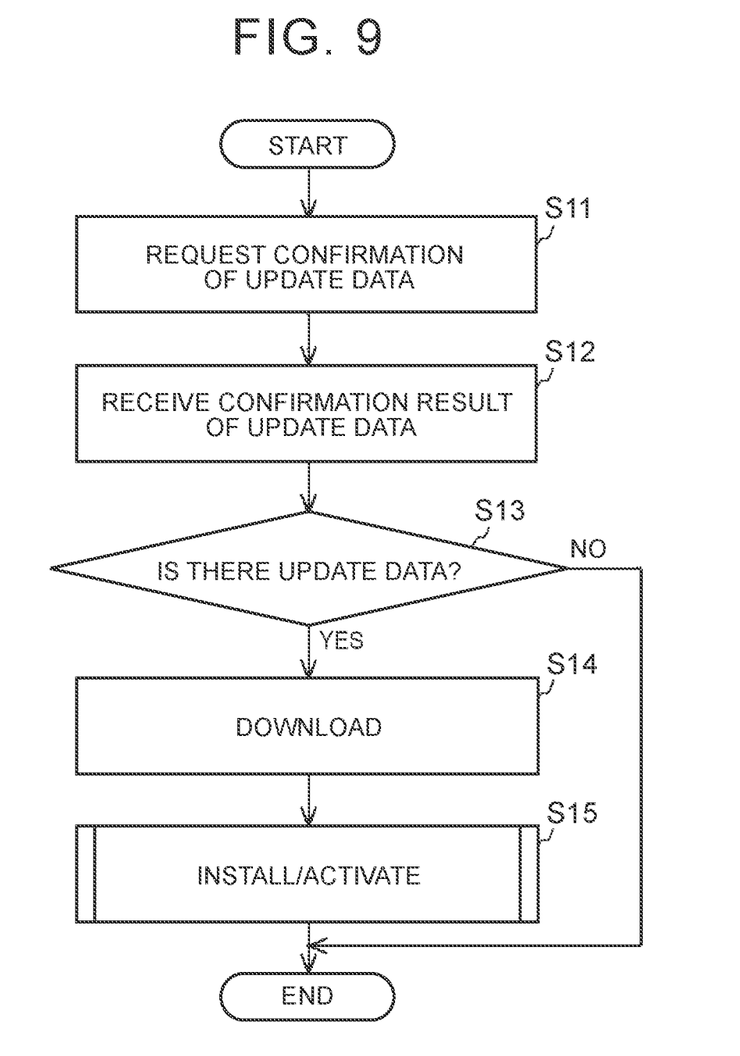
FIG. 9 is a flowchart showing an example of the software update process executed by the software update device according to the embodiment.

FIG. 9 is a flowchart showing an example of the control process executed by the software update device according to the embodiment. The control process shown in FIG. 9 is executed, for example, when power supply or ignition of the vehicle is turned on.

In step S11, the communication unit 37 transmits an update confirmation request including the vehicle ID and the combination of the software versions of the electronic control unit to the server 1. Then, the process proceeds to step S12.

In step S12, the communication unit 37 receives the confirmation result from the server 1. Then, the process proceeds to step S13.

In step S13, the control unit 39 determines whether there is software update data of the electronic control units 13a to 13d based on the confirmation result received from the server 1 in step S12. When the determination in step S13 is YES, the process proceeds to step S14; otherwise, the process ends.

In step S14, the communication unit 37 executes the download process. More specifically, the communication unit 37 transmits a download request for the distribution package to the server 1, receives the distribution package transmitted in response to the download request, and stores the received distribution package in the storage unit 38. The control unit 39 verifies the authenticity of the update data included in the received distribution package. In step S14, it may be determined whether the download can be performed, and completion of downloading may be notified to the server 1. Then, the process proceeds to step S15.

In step S15, the control unit 39 executes the installation process and the activation process for the electronic control unit to be updated, and ends the process.

Figure 10:
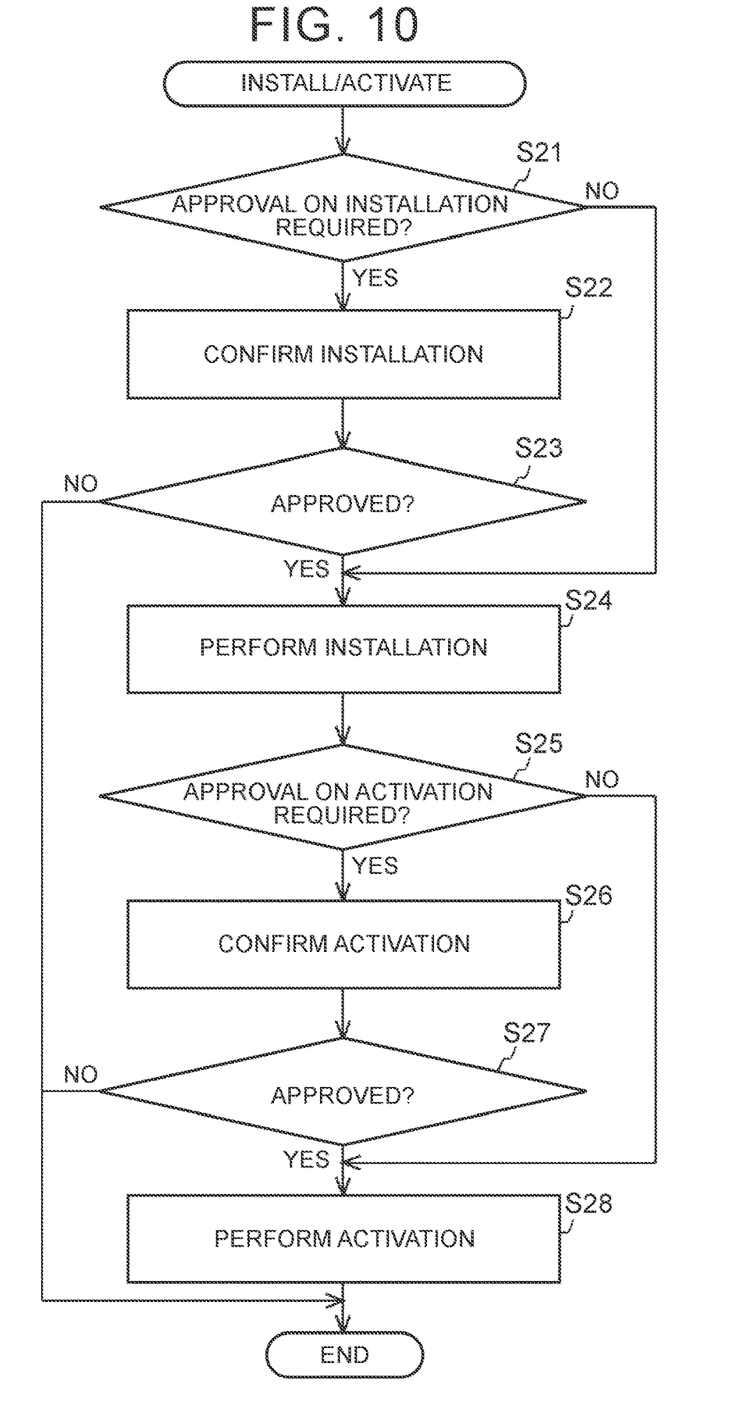
FIG. 10 is a flowchart showing details of installation and activation processes shown in FIG. 9.

FIG. 10 is a flowchart showing details of the installation and activation processes shown in FIG. 9.

In step S21, the control unit 39 determines whether the approval of the user or the administrator is required before executing the installation based on the instruction information included in the distribution package received from the server 1 in step S14 of FIG. 9. As described above, the instruction information is information set based on the life cycle status information stored in the server 1. When the determination in step S21 is YES, the process proceeds to step S22; otherwise, the process proceeds to step S24.

In step S22, the control unit 39 executes an installation confirmation process. For example, the control unit 39 displays an indication to start the program update of the in-vehicle device, an indication to request the approval of the user for starting the program update, and if necessary, an indication of the time required to install the update program and restrictions and precautions during installation, and receives an operation input by the user using an input means such as a touch panel and operation buttons. Then, the process proceeds to step S23.

In step S23, the control unit 39 determines whether the operation input of approving the software update (installation) has been performed. The operation input of approving the installation can be determined based on, for example, whether a button "approve", "start update", etc. displayed on the display device 14 is pressed. When the user does not immediately approve the start of software update (installation) and desires to start the software update (installation) later, such an intention can be received when a button "later" etc. is pressed. In this case, the control unit 39 determines NO in step S23. When the determination in step S23 is YES, the process proceeds to step S24; otherwise, the process ends.

In step S25, the control unit 39 determines whether the approval of the user or the administrator is required before executing the activation based on the instruction information included in the distribution package received from the server 1 in step S14 of FIG. 9. As described above, the instruction information is information set based on the life cycle status information stored in the server 1. When the determination in step S25 is YES, the process proceeds to step S26; otherwise, the process proceeds to step S28.

In step S26, the control unit 39 executes the activation confirmation process. As an activation confirmation process, the control unit 39 displays, for example, an indication that the program of the in-vehicle device is ready to be updated and the program can be updated by a specific operation such as turn-off of power supply or ignition, and if necessary, an indication of the time required for activation and restrictions and precautions during activation, and receives an operation input by the user using an input means such as a touch panel and operation buttons. Then, the process proceeds to step S27.

In step S27, the control unit 39 determines whether the operation input of approving the software update (activation) has been performed. The operation input of approving the activation can be determined based on, for example, whether a button "approve", "update", etc. displayed on the display device 14 is pressed. When the user does not immediately approve the software update (activation) and desires to perform the software update later, such an intention can be received when a button "later" etc. is pressed. In this case, the control unit 39 determines NO in step S27. When the determination in step S27 is YES, the process proceeds to step S28; otherwise, the process ends.

In step S28, the control unit 39 instructs the electronic control unit to be updated to activate the updated version of the software. Then, the process ends. The electronic control unit to be updated is restarted when a specific operation such as turn-off of power supply or ignition is performed, and executes the updated software. Thus, the software update (function update) of the electronic control unit is completed.

When there is only one software storage area provided in the storage device of the electronic control unit, writing of the update data overwrites the old software stored in the software storage area, so the installation and the activation need to be performed as a series of processes. In this case, in the process of FIG. 10, the process of steps S25 to S27 may be omitted.

As described above, the server 1 according to the present embodiment holds the life cycle status information indicating the state of the vehicle after manufacturing for each vehicle ID. When the software update of the vehicle is required, the server 1 can instruct the software update device 11 as to whether the software update is forcibly performed without asking for approval depending on the state of the vehicle within the life cycle. Thus, with the server 1 according to the present embodiment, the software update can be performed in a timely manner throughout the life cycle of the vehicle.

The function of the server 1 exemplified as the embodiment can be realized as an update management method executed by a computer including a processor (CPU), a memory, and a storage device, or an update management program executed by the computer, and a computer readable non-transitory storage medium that stores the update management program. Similarly, the function of the software update device 11 exemplified as the embodiment can be realized as an update control method executed by an in-vehicle computer including a processor (CPU), a memory, and a storage device, or an update control program executed by the in-vehicle computer, and a computer readable non-transitory storage medium that stores the update control program.

In the above embodiment, an example in which the software update device 11 provided in the in-vehicle network controls the software update of all the electronic control units 13a to 13d as the master device is described. However, any one of the electronic control units 13a to 13d may have the update control function shown in FIGS. 9 and 10 and control software updates of the other electronic control units, instead of providing the software update device 11. Further, instead of providing the software update device 11, the update control function shown in FIGS. 9 and 10 can be provided in an external device that can be connected to the in-vehicle network 2 by wire, to perform the software update process of the electronic control units 13a to 13d using the external device.

Since the server 1 according to the above embodiment centrally manages the life cycle status information, it is possible to use the server 1 as an information source for grasping the software update statuses of the registered vehicles (for example, the number of vehicles for which software updates by OTA have been completed and the number of vehicles for which software updates have not been completed) and the current states of the vehicles.

In addition, in the server 1 according to the above embodiment, a life cycle status "owned by corporation (with prior approval)" may be provided so that the owner can collectively give an approval to forcibly perform software update when a corporation owns a plurality of vehicles. For the vehicle having a setting of this life cycle status, instruction information instructing that the approval is not required may be generated on the precondition that the approval is obtained in advance. With this configuration, when a plurality of vehicles are owned by the same owner, software update by OTA can be easily performed.

The disclosed technology can be used in a network system for updating software of an electronic control unit.

What is claimed is:

1. A server comprising a processor configured to:
   store, for each of pieces of vehicle identification information that identifies a vehicle, life cycle status information indicating a distribution status of the vehicle after manufacturing, the life cycle status information being associated with the vehicle identification information;
   receive a confirmation request including the vehicle identification information from the vehicle;
   determine whether there is update data of software of the vehicle identified by the vehicle identification information included in the confirmation request when the processor receives the confirmation request; and
   transmit, to the vehicle, instruction information instructing whether approval is required at a time of execution of a software update process in the vehicle, based on the life cycle status information associated with the vehicle identification information included in the confirmation request, when the processor determines that there is the update data of the software of the vehicle.

2. The server according to claim 1, wherein:
   the processor is configured to store update data for software of an electronic control unit mounted on the vehicle; and
   the processor is configured to transmit the instruction information to the vehicle together with the update data.

3. The server according to claim 1, wherein as the life cycle status information, information indicating at least one of a fact that the vehicle is under development, a fact that the vehicle is being manufactured, a fact that the vehicle is being transported, a fact that the vehicle is being sold, a fact that the vehicle is owned by a user, a fact that the vehicle is under repair, and a type of the user of the vehicle is set.

4. The server according to claim 3, wherein the processor is configured, when information indicating a fact that the vehicle is in a yard or on a transport ship is set as the life cycle status information, to transmit, to the vehicle, instruction information indicating that the approval at the time of execution of the software update process is not required.

5. An update management method that is executed by a computer including a processor, a memory, and a storage device, the update management method comprising:
   storing, for each of pieces of vehicle identification information that identifies a vehicle, life cycle status information indicating a distribution status of the vehicle after manufacturing, the life cycle status information being associated with the vehicle identification information;
   receiving a confirmation request including the vehicle identification information from the vehicle;
   determining whether there is update data of software of the vehicle identified by the vehicle identification information included in the confirmation request when receiving the confirmation request; and
   transmitting, to the vehicle, instruction information instructing whether approval is required at a time of execution of a software update process in the vehicle, based on the life cycle status information associated with the vehicle identification information included in the confirmation request, when determining that there is the update data of the software of the vehicle.

6. A non-transitory storage medium storing instructions that are executable by one or more processors and that cause the one or more processors to perform functions comprising:
   storing, for each of pieces of vehicle identification information that identifies a vehicle, life cycle status information indicating a distribution status of the vehicle after manufacturing, the life cycle status information being associated with the vehicle identification information;

receiving a confirmation request including the vehicle identification information from the vehicle;

determining whether there is update data of software of the vehicle identified by the vehicle identification information included in the confirmation request when receiving the confirmation request; and transmitting, to the vehicle, instruction information instructing whether approval is required at a time of execution of a software update process in the vehicle, based on the life cycle status information associated with the vehicle identification information included in the confirmation request, when determining that there is the update data of the software of the vehicle.

7. A center comprising a processor configured to:

store, for each of pieces of vehicle identification information that identifies a vehicle, life cycle status information indicating a distribution status of the vehicle after manufacturing, the life cycle status information being associated with the vehicle identification information;

receive a confirmation request including the vehicle identification information from the vehicle;

determine whether there is update data of software of the vehicle identified by the vehicle identification information included in the confirmation request when the processor receives the confirmation request; and transmit, to the vehicle, instruction information instructing whether approval is required at a time of execution of a software update process in the vehicle, based on the life cycle status information associated with the vehicle identification information included in the confirmation request, when the processor determines that there is the update data of the software of the vehicle.

* * * * *